March 23, 1965 B. P. NITZSCHE 3,174,524
TIRE PLUGS FOR SINGLE TUBE TIRES
Filed June 27, 1963
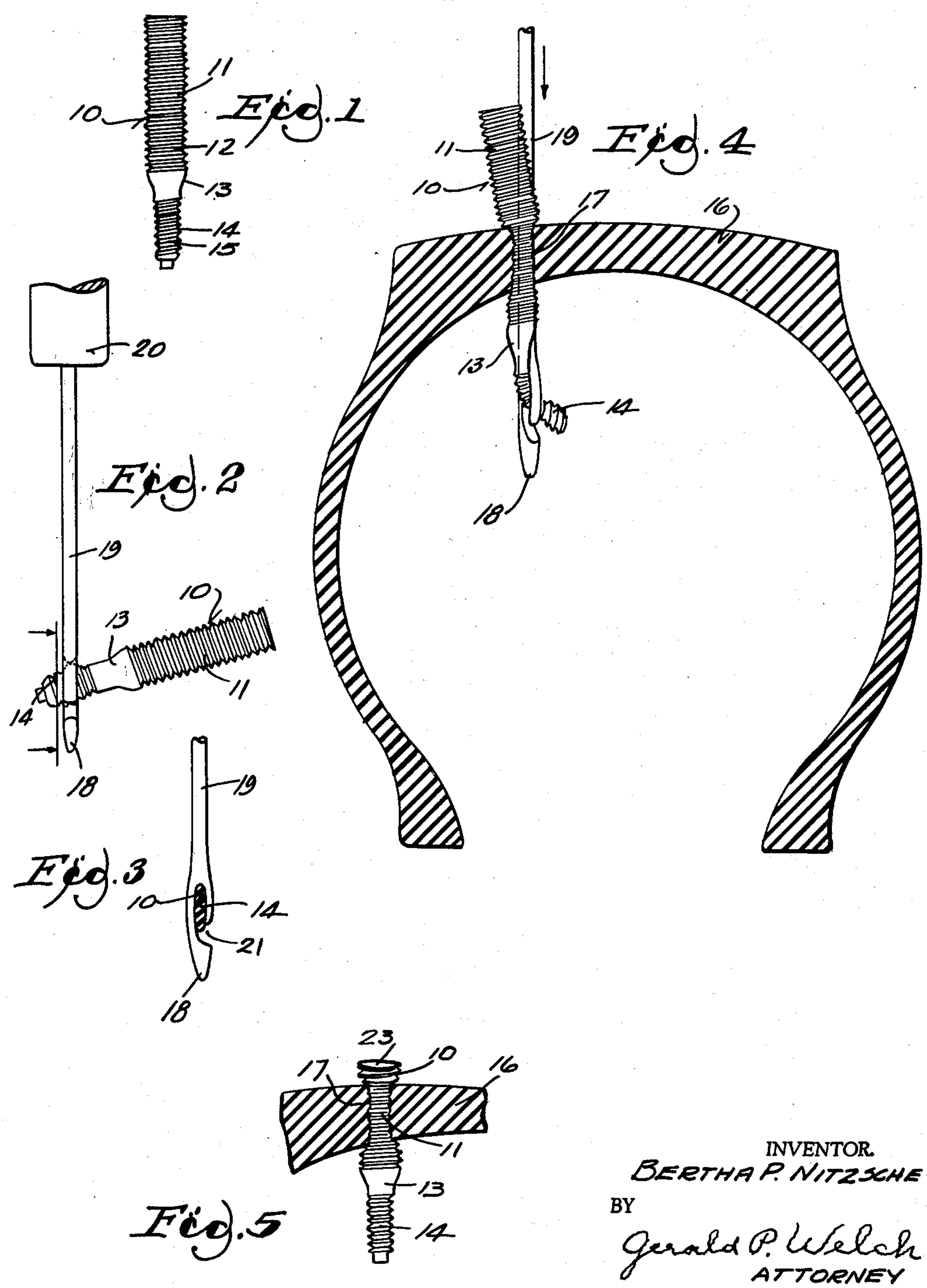
INVENTOR.
BERTHA P. NITZSCHE
BY
Gerald P. Welch
ATTORNEY United States Patent Office 3,174,524
Patented Mar. 23, 1965

3,174,524

TIRE PLUGS FOR SINGLE TUBE TIRES

Bertha P. Nitzsche, P.O. Box 207, Stoughton, Wis.

Filed June 27, 1963, Ser. No. 290,992
2 Claims. (Cl. 152—370)

This invention relates to improvements in tire plugs for single tube tires, and more particularly to a novel tire plug for single tube tires adapted for insertion from the outside of a tire.

An object of the invention is to provide a device of the type having an exterior helical thread which will grip the tire cords in a puncture hole when inserted therein.

Another object of the invention is to provide a device of the type having a plurality of helically disposed threads thereon.

Other and further objects of the invention will appear as the description proceeds, reference being had to the accompanying drawing, in which:

FIG. 1 is a side view in elevation of a tire rivet for single tube tires embodying the invention.

FIG. 2 illustrates the manner of threading the small end of the tire plug in the inserting tool.

FIG. 3 is a view, partly in section, taken on line 3—3 of FIG. 2.

FIG. 4 is a cross-sectional view of a tire showing a tire plug inserted in a puncture hole in the tire.

FIG. 5 is a segmentary view of a tire showing a tire plug inserted in a puncture hole thereof with the outer end properly cut off for use.

Referring more particularly to the drawings, the numeral 10 refers to the device generally, having an elongated body portion 11 provided with an exterior helical thread 12 thruout its length, and terminating at its lower end in a smooth, frusto-conical portion 13 and the reduced portion 14 also provided with the exterior helical thread 15.

In FIG. 4, a conventional single-tube automobile tire is shown in which a puncture hole at 17 thereof, has received the point 18 and shank 19 of the tool 20, and the plug 10 of which portion 14 has been threaded into the cleft at 21 of the point portion 18. The plug 10 is first coated with a rubber cement, and when stretched within the puncture hole at 17, the helical threads 12 will grip the cords (not shown) of the tire. After insertion of the plug 10 within the puncture, the protruding portion of the body 11 is clipped off a short distance from the tire 16, and driving use of the tire will vulcanize the cut portion 23 and said tire 16 externally of the puncture.

It will be understood that the device is capable of many modifications in structure and design, without departing from the spirit of the invention, within the scope of the appended claims.

Having thus described the invention, what is claimed and desired to be secured by Letters Patent, is:

1. An elongated headless tire plug formed of resilient material, a helical thread formed on the greater portion of its length, a reduced portion integral therewith, and a helical thread formed on said reduced portion.

2. An elongated headless tire plug formed of resilient material, a helical thread formed on the greater portion of its length, a reduced portion integral therewith, a helical thread formed on said reduced portion, and an intervening frustro-conical portion integral with the plug and its reduced portion.

References Cited by the Examiner

UNITED STATES PATENTS 570,942 11/96 Merritt ---------------- 152—370

FOREIGN PATENTS 202,896 8/56 Australia.
784,674 10/57 Great Britain.
831,501 3/60 Great Britain.
875,709 8/61 Great Britain.

ARTHUR L. LA POINT, *Primary Examiner.*